United States Patent [19]

Watanabe

[11] Patent Number: 4,650,619

[45] Date of Patent: Mar. 17, 1987

[54] METHOD OF MACHINING A CERAMIC MEMBER

[75] Inventor: Kuniaki Watanabe, Kashiwa, Japan

[73] Assignee: Toshiba Ceramics Co., Ltd., Tokyo, Japan

[21] Appl. No.: 640,810

[22] Filed: Aug. 15, 1984

[30] Foreign Application Priority Data

Dec. 29, 1983 [JP] Japan .................. 58-247242
Jul. 25, 1984 [JP] Japan .................. 59-154581
Aug. 8, 1984 [JP] Japan .................. 59-166130

[51] Int. Cl.$^4$ .................................... B29C 37/02
[52] U.S. Cl. .................. 264/25; 219/121 LM; 264/29.5; 264/44; 264/67; 264/134; 264/154; 264/162; 264/237
[58] Field of Search .............. 264/22, 44, 154, 25, 264/156, 26, 162, 67, 29.5, 80, 134, 237; 219/121 LM

[56] References Cited

U.S. PATENT DOCUMENTS

| | | | |
|---|---|---|---|
| 3,429,486 | 2/1969 | Cope et al. | 264/29.5 |
| 3,539,667 | 11/1970 | Nameishi | 264/67 |
| 3,594,261 | 7/1971 | Broerman | 264/154 |
| 3,668,028 | 6/1972 | Short | 264/154 |
| 3,989,778 | 11/1976 | Osborne | 425/174.4 |
| 4,034,031 | 7/1977 | Lersmacher et al. | 264/156 |
| 4,216,183 | 8/1980 | Siemssen | 264/80 |
| 4,225,544 | 9/1980 | Dantzig et al. | 264/44 |
| 4,298,560 | 11/1981 | Plass | 264/156 |
| 4,445,993 | 5/1984 | Stutz et al. | 264/25 |
| 4,497,473 | 2/1985 | Robyn et al. | 264/30 |

FOREIGN PATENT DOCUMENTS

| | | | |
|---|---|---|---|
| 2115548 | 10/1972 | Fed. Rep. of Germany | 264/25 |
| 2153503 | 5/1973 | Fed. Rep. of Germany | 264/154 |
| 58-57916 | 4/1983 | Japan | 264/25 |

Primary Examiner—Jeffery Thurlow
Attorney, Agent, or Firm—Oblon, Fisher, Spivak, McClelland, & Maier

[57] ABSTRACT

Gas supply passages can be formed accurately in a ceramic member by a ceramic member machining method comprising irradiating laser beams to a ceramic member thereby forming gas supply passages in the member.

5 Claims, 7 Drawing Figures

METHOD OF MACHINING A CERAMIC MEMBER

BACKGROUND OF THE INVENTION

Field of the Invention

This invention concerns a method of and an apparatus for forming gas supply passages in a member made of ceramics and, more specifically, it relates to a method of and apparatus for forming gas supply passages to a stationary plate or a slide plate made of a ceramic member for use in a molten metal discharging slide gate attached to the bottom portion of a ladle or tundish in the case of casting molten metals.

Upon casting molten steels by way of a conventional continuous casting process, a molten metal discharging device comprising a stationary plate and a slide plate is attached to the bottom portion of a ladle or a tundish accomodating the molten steels and the flow rate of the molten steels is adjusted by causing the slide plate to move slidably with respect to the stationary plate thereby opening or closing a passage bore for the molten steels. In the above-mentioned molten metal discharging device, an inert gas such as argon is introduced through small holes formed in the stationary plate or the slide plate to the molten steel passage bore so as to prevent the clogging in the passage bore caused by the solidification of the molten steels and/or deposition of oxides of metal such as Al, Ti, Ca, Cr, Mn, Si or Ni.

The inert gas is supplied, for instance, by disposing a gas supply member formed with a plurality of small holes each in 0.1–1.0 mm diameter or a gas supply member formed with a plurality of slits each in rectangular cross section, to a predetermined position. The small holes or slits have been formed in the plate by previously embedding hard papers or vinyl chloride wires at predetermined positions in a refractory mixed body upon molding of the plate and then burning out them during a sintering or burning step, or by forming them by drilling work after the sintering.

However, fabrication of the small holes or slits by the use of hard papers or vinyl chloride wires have beed disadvantageous in that the small holes or the slits can not always penetrate the plate completely, diameter for each of the bores may possibly vary to make the distribution of the supplied gas irregular and the work is very much labourious. While on the other hand, the drilling work is very difficult and time-consuming in the case of machining the thick material to make the machining cost more expensive.

SUMMARY OF THE INVENTION

This invention has been made to provide a method of accurately forming small holes, for instance, small holes each having a circular cross section or slits each having a rectangular cross section as gas supply passages in a plate member made of ceramics, for example, a gas supply member fitted to a stationary plate, or stationary or slide plate itself of a molten metal discharging slide gate.

The above object can be attained in accordance with this invention by a method of machining a ceramic member which comprises a step of forming gas supply passages in a ceramic member by irradiating laser beams to the member.

The ceramic member preferably comprises a slide plate or a stationary plate of a molten metal discharging slide gate.

The step of irradiating the laser beams preferably includes focusing the irradiated laser beams.

The step of irradiating the laser beams includes, more preferably, deflecting the irradiated laser beams.

The method further includes preferably a step of blowing a gas to a portion of the ceramic member melted under the irradiation of the laser beams for removing molten matters of the ceramic member.

The step of forming gas supply passages in the ceramic member by the irradiation of the laser beams to the ceramic member comprises preferably displacing the ceramic member while situating the laser beam irradiation means at a stationary position and irradiating the laser beams on every displacement step of the ceramic member in order to form a plurality of gas supply passages to the ceramic member.

The step of forming gas supply passages to the ceramic member by the irradiation of the laser beams to the ceramic member comprises preferably displacing the laser beam irradiation means while situating the ceramic member at a stationary position and irradiating the laser beams on every displacement of the laser beam irradiation means in order to form a plurality of gas supply passages to the ceramic member.

Preferably, the ceramic member is impregnated with a component including a composition to prevent a laser beam reflection at the time of the laser beam irradiation, before the ceramic member is irradiated by the laser beam.

Preferably, the component impregnated in the ceramic member is a tar or a pitch. Tar or the pitch is impregnated 15% by weight or less than 15% by weight.

Another object of this invention is to provide an apparatus for practicing the above-described method.

This object can be attained in accordance with the invention by a machining apparatus for a ceramic member comprising:

a laser beam source for emitting laser beams, a focusing means for focusing laser beams emitted from the beam source, and an enclosure means for enclosing the optical path of the focused laser beams, wherein the enclosure means compriees:

a base portion including said focusing means disposed to the inside thereof and having a gas introduction hole at a position nearer to the ceramic member than to the focusing means for removing a molten part of the ceramic member melted by the focused laser beams from a remaining part of the ceramic member, a reduced-diameter portion extended from the base portion while being reduced with its diameter so as to guide the gas introduced from the gas introduction hole to the ceramic member, and an exit opening disposed at the restricted top end of the reduced-diameter portion for exiting the focused laser beams and the gas introduced from the gas introduction hole.

According to the method and apparatus of this invention for fabricating the ceramic member, gas supply passages comprising small holes or narrow slits, for instance, of about 0.2–1.0 mm in bore size can be formed rapidly and uniformly to a ceramic member. Since the holes in the ceramic member are formed by removing the portion of the ceramic member which is melted under the irradiation of the laser beams according to this invention, the machined surface, that is, the inner circumferential wall and the surface at the periphery of the hole is in a melted state, whereby the resistance against corrosion due to contact with the molten steels can be improved as compared with the prior case. In order to remove or to scatter the molten portion, a gas may be blown to the molten portion of the ceramic member. However, if the molten portion can be scattered automatically by the laser beam irradiation, such gas blowing may be saved. The center of the gas stream to be blown to the molten portion may be deviated from the center of the irradiated laser beams and, further, the blown gas may be warmed. The gas usable herein includes inert gases such as of argon or nitrogen, as well as non-inert gas such as of oxygen depending on the case.

The ceramic member to be machined is impregnated with tar material (tar or pitch), before laser beam irradiation. The ceramic member impregnated with tar material increases the durability of the machined gas supply member or of the machined sliding plate, since the volatile components in the tar material volatiled at the temperature during the discharging of the molten metal, protect the surface of the ceramic member, and the residual components, remained in the pore of the ceramic member after the volatile components are volatiled prevent the ceramic member from the penetration of the molten metal into the pore of the ceramic member.

Further, by impregnation of the tar material, the ceramic member becomes easily machinable, since the heat radiated by the laser beam is absorbed in the part of the ceramic member to be machined, resulting from the increasing of the blackness of the ceramic member and from the prevention of the laser beam reflection.

BRIEF DESCRIPTION OF THE DRAWINGS

This invention is to be described in more details referring to the accompanying drawings, by which the foregoing and other objects, as well as the features of this invention will be made clearer in which.

DESCRIPTION OF PREFERRED EMBODIMENTS

Figure 1:
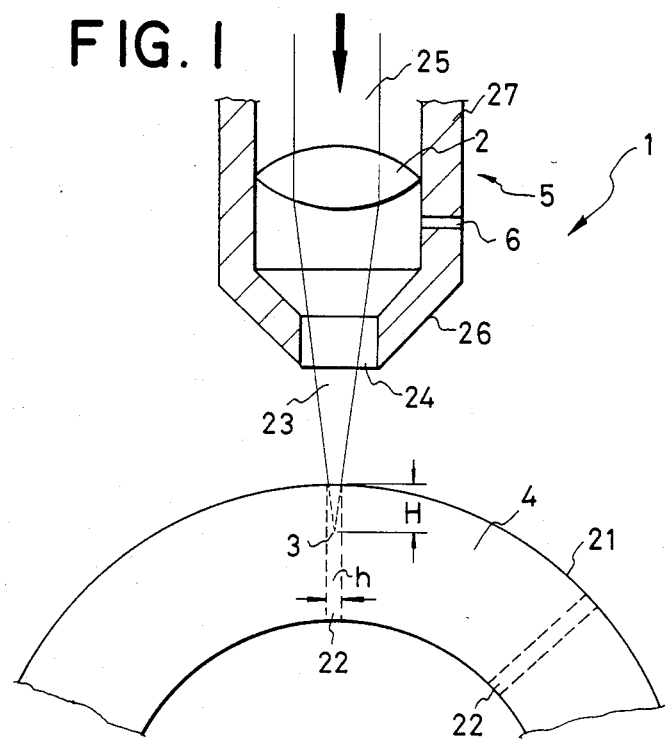
FIG. 1 is an explanatory cross-sectional view for a laser device as a preferred embodiment according to this invention.

FIG. 1 shows a $CO_2$ laser device as a preferred embodiment according to this invention. The $CO_2$ laser as a laser beam source may be replaced with YAG laser or the like provided that it has a sufficient beam power. Laser beams 25 emitted from the beam source are focused through lens 2 to a focal point 3. If the laser beams have a sufficient intensity, a slit or the like may be disposed to the optical path of the laser beams for restricting the width of the beams. A nozzle 5 comprises a base portion 27 having a lens 2 and a gas introduction hole 6, a reduced-diameter portion 26 for guiding the introduced gas and an exit opening 24 for exiting the focused laser beams and the introduced gas. The focal point 3 is situated to the inside of a workpiece 4 as a ceramic member, for instance, a disc-like gas supply member fitted to a stationary plate of a molten metal discharging slide gate. Focused laser beams 23 are irradiated from the outer surface 21 of the workpiece 4 to form a small hole 22 as a gas supply passage in the workpiece 4. Expressing the focal depth H by the distance from the outer surface 21 of the workpiece 4 to the focal point 3 and the bore diameter of the small hole 22 by h as illustrated in the figure, the bore diameter h enlarges as the focal depth H rncreases to take much more time in forming the hole since the laser density goes lower. The focal depth H for forming the small hole 22 as the gas supply passage is preferably between 0–10 mm. The focal depth H may be changed on every emission of laser pulses.

The work piece 4 is impregnated with tar material before the laser beam irradiation. The operation of the impregnation, if desired, may be provided by two times or more than 2 times repeating of the cycle including the vacuum impregnation and the baking, that is, the process in which after the ceramic member is dipped in the bath containing tar material, the ceramic member taken out from the bath is baked is repeated two times or more than two times. Other liquid resins may be used for the impregnation.

The amount of the impregnated tar material is preferably 15% by weight or less than 15% by weight. When the amount of the impregnated material becomes more than 15% by weight, the heat conductivity of the ceramic member is increased. Then the heat radiated by the laser beam is dispersed in the ceramic body not to be concentrated to the part of the ceramic member to be machined. Because of the above described reason the machining of the desired small hole or slit becomes difficult.

The introduction hole for auxiliary gas 6 is disposed in the base portion 27 of the nozzle 5 for protecting the lens 2 and scattering the molten product of the work 4. The auxiliary gas usable herein may include gaseous nitrogen, oxygen, airs or the likes, gaseous nitrogen and airs being preferred. A gas flow rate is preferably between 30–150 liter/min. If the flow rate is lower than 30 liter/min scattering of the molten portion becomes insufficient to which decreases the hole opening ratio (that is, ratio of the number of irradiation cycles of the laser beams for opening the hole relative to the number of holes formed) and, while on the other hand, if the flow rate exceeds 150 liter/min, excess scattering is caused to undesirably enlarge the bore diameter. The auxiliary gas may be introduced either continuously or intermittently on every emission of the laser beams.

It is required for the laser beams used in the method and apparatus according to this invention that they have an average beam power of more than 200 W, since a lower power may undesirably take longer time for the machining. It is also preferred that the maximum beam power is greater than 1 KW, the frequency is between 50–150 Hz and the pulse duration is between 3–10 ms. Outside of the above described range, no appropriate temperature can be attained at the surface to be worked, longer time is required for forming the holes and the hole opening ratio is worsened as well.

A preferred focal length of the lens 2 is between 5-15 inches, because if it shorter than 5 inches the hole opening rate is reduced due to the defocusing and, while on the other hand, if it exceeds 15 inches, the density of the laser beams 1 is decreased to take a longer time for the formation of the holes.

While it is desirable to make the distance between the outer surface 21 of the work piece 4 and the exit 24 of the nozzle 5 as narrow as possible, if the distance is shorter than 2 mm, the lens may be contaminated with the molten scattering matters or clogging may occur in the nozzle 5. Accordingly, the distance is preferably between 2 mm–15 mm. On the other hand, if the distance exceeds 15 mm, scattering of the molten matters is reduced to decrease the hole opening ratio.

The mode of the laser beams 25 generally includes a single mode and a multi mode, the former being preferred for forming the small holes.

When the disc-like work piece 4 is rotated around the disc center thereof as a center axis while putting the laser device 1 stationary, a plurality of small holes 22 are formed along the circumferential direction of the work piece 4. While on the other hand, when the work piece 4 is displaced in the direction of its height, a plurality of small holes 22 are formed along the height of the work piece 4. Furthermore, when the above described rotation and the displacement in the direction of the height of the work piece 4 are combined, optional number of small holes 22 may be formed at desired positions from the outer surface 21. Instead of rotating or displacing the werk piece 4, the laser device 1 may be displaced while putting the work piece 4 stationary so that focused laser beams 23 are irradiated at desired positions where the small holes 22 are to be formed.

The cross section for each of the small holes 22 as the gas supply passage is preferably of a circular shape in 0.2–1 mm bore diameter. The cross sectional shape may also be elliptic or any other configurations. Instead of the small holes, slits of a rectangular cross sectional shape may be formed.

Although the explanation has been made for the case where the work piece 4 is a disc-like gas supply member fitted to the stationary plate of a molten metal discharging slide gate, the work piece 4 may be a slide plate.

Figure 2:
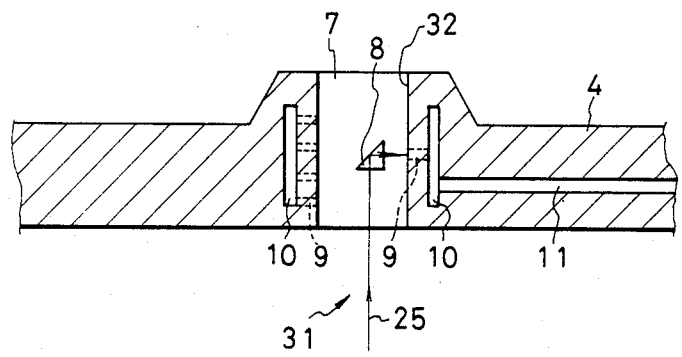
FIG. 2 is an explanatory cross-sectional view for a laser device as another preferred embodiment according to this invention.

FIG. 2 shows a laser device 31 including a prism 8 as a deflection means for machining small holes 9 to a circumferential wall 32 in a molten metal discharging port 7 for a stationary plate of a molten metal discharging slide valve. In the illustrated laser device 31, laser beams 25 are reflected by the prism 8 inserted in the molten metal discharging port 7 of a work piece 4 (stationary plate) to perforate the small holes or slits 9 from the circumferential wall 32 to the inside of the molten metal discharging port 7. The deflection means may be a reflecting mirror, instead of the prism 8. Reference numeral 10 represents a gas pressure-unifying zone and 11 represents a gas introduction hole. The pressure of the gas introduced from the gas introduction hole 11 is unified in the gas pressure-unifying zone 10. The gas pressure-unifying zone is in communication with the small holes 9 machined as described above to supply a pressure-unified gas into the molten metal discharging port 7 through the small holes 9.

Figure 3:
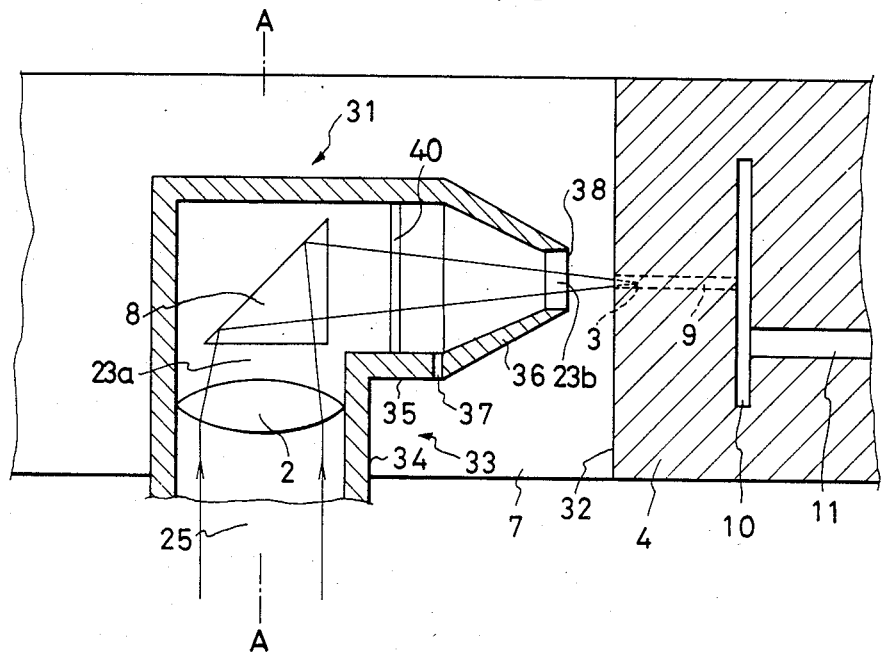
FIG. 3 is an explanatory cross-sectional view for the details of the laser device shown in FIG. 2, FIGS. 4 and 5 are explanatory cross-sectional views, respectively, for a first embodiment and a second embodiment of the molten metal discharging slide gate including respectively ceramic members machined by the laser device shown in FIG. 1, and FIGS. 6 and 7 are explanatory cross-sectional views, respectively, for a third embodiment and a fourth embodiment of the molten metal discharging slide gate including respectively ceramic members machined by the laser device shown in FIG. 2 and FIG. 3.

FIG. 3 shows the details of the laser device 31 including the prism 8 as the deflection means. The laser device 31 comprises a lens 2 for focusing laser beams 25 emitted from a laser beam source and a prism 8 for deflecting laser beams 23a focused by lens 2. The prism 8 and the lens 2 are enclosed within a nozzle 33 having a straight path part 34, a deflection part 35, a reduced-diameter part 36, a gas introduction hole 37 and an exit opening 38. The nozzle 33 is disposed so that the central axis A of the straight path part 34 is aligned with the center for the molten metal discharging port 7. The focal point 3 of focused laser beams 23b is situated at the inside of the stationary plate of the molten metal discharging slide gate as a work piece 4, and small holes 9 are machined from the inner surface 32 of the work piece 4 toward the gas pressure-unifying zone 10, which is in communication with a gas introduction hole 11. A plurality of such small holes 9 may be machined either by displacing the work piece 4 while putting the laser device 31 stationary or by displacing the laser device 31 while putting the work piece 4 stationary. Reference numeral 40 represents a glass plate penetrable by laser beams 23b to screen the space in the deflection path. The glass plate 40 may be omitted.

FIG. 4 through FIG. 7 show molten metal discharging slide gate comprising stationary plates 13, 15 and a slide plate 14 machined respectively by the method and apparatus according to this invention.

Figure 4:
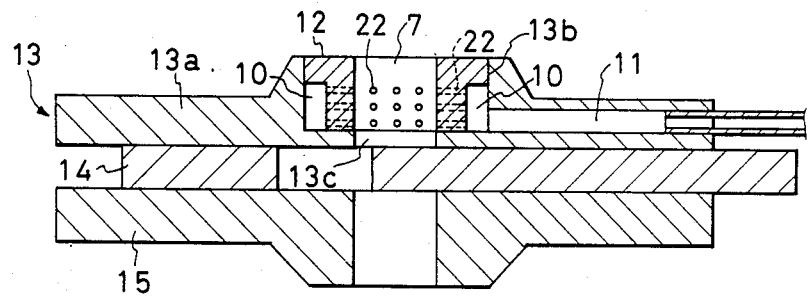

FIG. 4 shows a slide gate including a gas supply member 12 fitted to a stationary plate 13 and having small holes 22 machined by the laser device shown in FIG. 1. The gas supply member 12 is usually secured to the stationary plate body 13a by means of mortars or the likes. The small holes 22 are communicated with a gas introduction hole 11 by way of a gas pressure-unifying zone 10 formed in the stationary plate body 13a.

The gas supply member 12 and the stationary plate body 13a are molded respectively as an unmachined body of the gas supply body 12 and an unmachined body of the stationary plate body 13a by means of hydraulic press after mixing and kneading of the powdered alumina. The molded unmachined bodies of the gas supply body 12 and the stationary plate body 13a are sintered respectively at a temperature of about 1600° C. after desiccation in the water contents 1 and less than 1% thereof. The sintered unmachined bodies of the gas supply body 12 and the stationary plate body 13a are vacuum-impregnated respectively for impregnation with tar material of 5% by weight. The impregnated unmachined body of the gas supply body 12 and stationary plate body are heated respectively to the temperature of about 300° C. and then are mechanically treated to remove the adhered matters at the surface thereof. Following the mechanical treating, a recess 13b with an opening 13c is machined in the unmachined stationary plate body 13a for putting the machined gas supply body 12. To obtain sealing ability and sliding ability during the use of the stationary plate as a slide gate the surface of the stationary plate 13 contacting with the sliding plate 14 is machined by means of diamond blade. The mechanically treated unmachined body of the gas supply member 12 is irradiated with a $CO_2$ laser adjusting the power to 500 W, frequency to 50 Hz, and setting the focal length of the lens to 10 inch, focal depth H from the surface to 6 mm and the distance between the outer surface 21 of the work piece 4 and the nozzle top end to 6 mm, under the flow of $N_2$ gas at 4 kg/cm² of pressure and 70 liter/min. flow rate as an auxiliary gas. By above process, the gas supply member 12 with 50 small holes each 0.3 mm in the average bore diameter is obtained. A stationary plate 13 is made by putting the laser machined gas supply member 12 into the recess 13b of the stationary plate body 13a.

Figure 5:
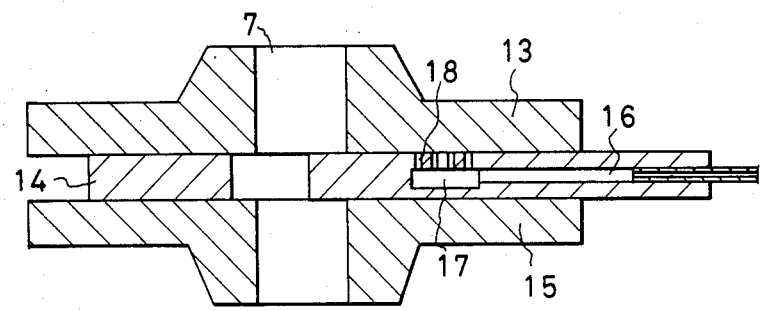

FIG. 5 shows a slide gate in which a gas supply portion is formed to a slide plate 14. Between an upper stationary plate 13 and a lower stationary plate 15, is disposed a slide plate 14. A gas introduction hole 16 is formed in the slide plate 14 and a gas-unifying zone 17 is formed at the top end of the hole 16. Further, a plurality of small holes 18 are formed to the slide plate 14 by the laser device 1 shown in FIG. 1. When the molten metal discharging port 7 is closed by the slide plate 14, the small holes 18 situate at the bottom of the discharging port 7 to blow out a gas into the molten steels in the same manner as in the small holes 22.

Figure 6:
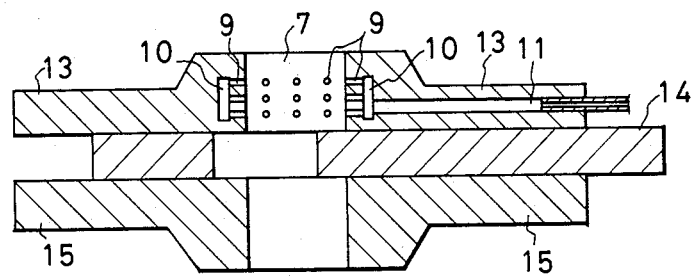

FIG. 6 shows a slide gate having small holes 9 machined to a stationary plate 13 by the laser device 31 shown in FIG. 2 and FIG. 3. The small holes 9 communicate a molten metal discharging port 7 with a gas introduction hole 11 by way of a gas pressure-unifying zone 10 disposed in the stationary plate 13.

Figure 7:
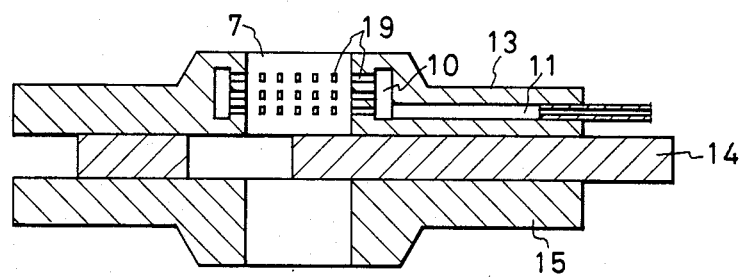

FIG. 7 shows a slide gate having a stationary plate 13 machined with slits 19 instead of the small holes.

This invention will now be described by way of examples.

EXAMPLE 1

Small holes were machined from the outer surface through the inside of a ring-like gas supply member prepared by sintering high alumina content ceramic member (15 mm in thickness) by using a $CO_2$ laser while adjusting the average power to 500 W, oscillation frequency to 100 Hz and pulse duration to 5 ms and setting the focal length of the lens 10 inch, focal depth (depth from the work surface) to 5 mm and the distance between the work surface and the nozzle top end to 5 mm, under the flow of $N_2$ gas at 3 kg/cm$^2$ of pressure and 70 liter/min flow rate as an auxiliary gas.

After carrying out the fabrication for the small holes by the number of fifty, the average time required for forming the holes was 1 sec/one hole, and all of the fifty small holes each 0.3 mm in the average bore diameter were perforated completely.

EXAMPLE 2

The small holes were machined to the same ring-like gas supply member prepared by sintering high alumina content ceramic member (15 mm in thickness) as used in Example 1 while varying the average laser power, frequency, focal length of the lens, focal depth, distance to the nozzle top end, flow rate of the auxiliary gas and the irradiation time as shown in Table 1 below.

TABLE 1

| No. | Average power (W) | Frequency (Hz) | Lens focal point (inch) | Distance between work surface and nozzle top end (mm) | Focal depth (mm) | Auxilliary gas flow rate (liter/min) | Irradiated time (sec) | Bore diameter (mm) | Hole opening rate (%) |
|---|---|---|---|---|---|---|---|---|---|
| 1. | 500 | 100 | 10 | 5 | 5 | 70 | 1 | 0.3 | 100 |
| 2. | 150 | 100 | 10 | 5 | 5 | 70 | 10 | 0.4 | 64 |
| 3. | 200 | 100 | 10 | 5 | 5 | 70 | 2 | 0.3 | 94 |
| 4. | 500 | 30 | 10 | 5 | 5 | 70 | 7 | 0.4 | 70 |
| 5. | 500 | 50 | 10 | 5 | 5 | 70 | 2 | 0.3 | 98 |
| 6. | 500 | 150 | 10 | 5 | 5 | 70 | 1 | 0.3 | 100 |
| 7. | 500 | 200 | 10 | 5 | 5 | 70 | 7 | 0.5 | 82 |
| 8. | 500 | 100 | 3 | 5 | 5 | 70 | 5 | 0.3 | 76 |
| 9. | 500 | 100 | 5 | 5 | 5 | 70 | 2 | 0.4 | 92 |
| 10. | 500 | 100 | 15 | 5 | 5 | 70 | 2 | 0.4 | 100 |
| 11. | 500 | 100 | 20 | 5 | 5 | 70 | 8 | 1.0 | 90 |
| 12. | 500 | 100 | 10 | 5 | −3 | 70 | 2 | 1.1 | 92 |
| 13. | 500 | 100 | 10 | 5 | 0 | 70 | 1 | 0.3 | 100 |
| 14. | 500 | 100 | 10 | 5 | 10 | 70 | 1 | 0.4 | 94 |
| 15. | 500 | 100 | 10 | 5 | 15 | 70 | 7 | 1.2 | 86 |
| 16. | 500 | 100 | 10 | 5 | 5 | 20 | 2 | 0.3 | 62 |
| 17. | 500 | 100 | 10 | 5 | 5 | 30 | 2 | 0.3 | 96 |
| 18. | 500 | 100 | 10 | 5 | 5 | 150 | 2 | 0.4 | 100 |
| 19. | 500 | 100 | 10 | 5 | 5 | 200 | 2 | 1.1 | 100 |
| 20. | 500 | 100 | 10 | 20 | 5 | 70 | 5 | 1.2 | 74 |

As can be seen from the Table above, the method and apparatus according to this invention provide an advantage that small holes or narrow slits of about 0.2-1.0 mm in bore size can be machined rapidly (several secs) and uniformly.

In the examples described above, high alumina content ceramic member is used. Other ceramic members, including zircon or zirconia ceramic material, are machined by the described method. Work pieces of zircon or zirconia ceramic member are impregnated with tar materials in the same process as that of the work piece 4.

By the above described impregnation, those ceramic members become easily machinable, resulting from the increasing of the blackness thereof and from the prevention of the laser beam reflection. In other portion than that irradiated by the laser beams, the surface of the ceramic member is protected by the volatile components in the tar material volatiled at the temperature during the discharging of the molten metal, and the penetration of the molten metals into the pore of the ceramic member is prevented by the residual components, remained in the pore of the ceramic member after the volatile components are volatiled.

The effect of the tar-impregnation to some ceramic members is shown in Table 2 below.

TABLE 2

| Ceramics | Tar-impregnation | Apparent porosity (%) | Bulk specific weight | Gas permeability (ml · cm/sec · cm$^2$ · cm $H_2O$) |
|---|---|---|---|---|
| E324D (Porous brick) | — | 29.9 | 2.59 | $3.2 \times 10^{-1}$ |
| TNZ (Zirconia) | Untreated | 24.2 | 4.26 | $4.0 \times 10^{-2}$ |
|  | Treated | 4.9 | 4.45 | $1.9 \times 10^{-3}$ |
| TNZH | Untreated | 23.7 | 3.50 | $7.0 \times 10^{-3}$ |

TABLE 2-continued

| Ceramics | Tar-impregnation | Apparent porosity (%) | Bulk specific weight | Gas permeability (ml · cm/sec · cm² · cm H₂O) |
|---|---|---|---|---|
| (Zircon) | Treated | 4.7 | 3.72 | $1.4 \times 10^{-4}$ |
| TX-K | Untreated | 14.6 | 2.92 | $4.0 \times 10^{-3}$ |
| (Alumina) | Treated | 3.4 | 3.05 | $5.0 \times 10^{-4}$ |

Furthermore, when the molten metals were cast by using a plate member machined by the method and apparatus according to this invention, a sufficient amount of gas could be supplied and corrosion or closure to the small holes due to the molten metal scarcely resulted and, accordingly, it was found that the plate was excellent as compared with those members fabricated by the conventional methods and apparatus.

What is claimed is:

1. A method for producing a sintered ceramic member having a plurality of penetrating holes for passing a gas therethrough, wherein the method comprises;

a step of impregnating the ceramic member with tar or pitch by an amount of 15% or less than 15% by weight thereof to prevent a laser beam reflection in a subsequent step of a laser beam irradiation, a step of forming each of the penetrating holes by irradiating a laser beam on a portion of the ceramic member while focusing the irradiated laser beam, and a step of blowing a gas at a gas flow rate of approximately 30 to 150 liters/min to said portion of the ceramic member melted under the irradiation of the laser beam for removing the molten portion of the ceramic member, thereby solidifying the portion of the ceramic member constituting a circumferential wall of said each penetrating hole.

2. The method of claim 1, in which the ceramic member comprises one of a slide plate and a stationary plate of a molten metal discharging slide gate where the discharge of the molten metal through a passage bore in the stationary plate is controlled by the slide plate, and the plurality of penetrating holes are formed at such positions of said one of said slide plate and said stationary plate that one end of said each penetrating hole can be opened to the passage bore so that the gas passed through the penetrating holes can be introduced into the passage bore.

3. The method of claim 1, in which the focusing of the laser beams is combined with deflection of the laser beam.

4. The method of claim 1, in which the step of forming the penetrating holes to the ceramic member by the irradiation of the laser beams to the ceramic member includes displacing the ceramic member while situating the laser beam irradiation means at a stationary position and irradiating the laser beams on every displacement of the ceramic member in order to form the plurality of penetrating holes to the ceramic member.

5. The method of claim 1, in which the step of forming the penetrating holes to the ceramic member by the irradiation of the laser beams to the ceramic member includes displacing the laser beam irradiation means while situating the ceramic member at a stationary position and irradiating the laser beams in every displacement of the laser beam irradiation means in order to form the plurality of penetrating holes to the ceramic member.

* * * * *